(12) United States Patent
Cruise et al.

(10) Patent No.: US 11,373,113 B1
(45) Date of Patent: Jun. 28, 2022

(54) METHODS AND APPARATUS FOR PARALLEL QUANTUM COMPUTING

(71) Applicant: River Lane Research Ltd., Cambridge (GB)

(72) Inventors: James Cruise, Cambridge (GB); Tom Parks, Cambridge (GB)

(73) Assignee: River Lane Research Ltd., Cambridge (GB)

( * ) Notice: Subject to any disclaimer, the term of this patent is extended or adjusted under 35 U.S.C. 154(b) by 0 days.

(21) Appl. No.: 17/248,171

(22) Filed: Jan. 12, 2021

(51) Int. Cl.
  *G06N 10/00* (2022.01)
  *G06F 9/30* (2018.01)
  *G06F 15/82* (2006.01)

(52) U.S. Cl.
  CPC ......... *G06N 10/00* (2019.01); *G06F 9/30101* (2013.01); *G06F 15/82* (2013.01)

(58) Field of Classification Search
  None
  See application file for complete search history.

(56) References Cited

U.S. PATENT DOCUMENTS

| | | | | |
|---|---|---|---|---|
| 7,035,411 | B2 * | 4/2006 | Azuma | G06N 10/00 380/263 |
| 10,223,643 | B1 * | 3/2019 | Bishop | G06N 10/00 |
| 10,726,351 | B1 * | 7/2020 | Li | H03K 19/1958 |
| 2018/0260245 | A1 * | 9/2018 | Smith | G06N 10/00 |

(Continued)

OTHER PUBLICATIONS

Butko,A. et al., Understanding Quantum Control Processor Capabilities and Limitations through Circuit Characterization, 2020,IEEE, pp. 66-75. (Year: 2020).*

(Continued)

*Primary Examiner* — Eric Coleman
(74) *Attorney, Agent, or Firm* — Maschoff Brennan

(57) ABSTRACT

An apparatus can be configured to control a quantum memory of a quantum computer. The quantum memory can have a first qubit. The apparatus can comprise: a first-classical-register; a first-clock; a first-machine-language-buffer, that stores a first-machine-language-circuit; and a first-implementer. The first-machine-language-circuit includes: a first-timestamp; a first-qubit-identifier unique to the first qubit; a first-qubit-control-instruction; and a first-protected-location of the first-classical-register. The first-implementer can be configured to: read the first-machine-language-circuit from the first-machine-language-buffer; and read a first-control-value from the first-protected-location of the first-classical-register, the first-control-value can be configured to encode either a first-execute-instruction or a first-alternate-control-instruction. If the first-control-value encodes the first-execute-instruction then the implementer can determine a first-control-circuit for the first qubit; read a first-synchronization-time from the first-clock; and compare the first-synchronization-time with the first-timestamp to determine a first-timing-criterion and when the first-timing-criterion is satisfied send the first-control-circuit to first-qubit-control-hardware for application to the first qubit.

20 Claims, 5 Drawing Sheets

(56) References Cited

U.S. PATENT DOCUMENTS

2020/0174836 A1* 6/2020 Gunnels .............. G06F 9/5038
2020/0394544 A1* 12/2020 Low ..................... G06N 10/00

OTHER PUBLICATIONS

Khalaf, R.Z. et al., Novel Quantum Encryption Algorithm Based on Multiqubit Quantum Shift Register and Hill Cipher, 2014,Hindawi Publishing Corp., 6 pages. (Year: 2014).*
Fu, X et al., An Experimental Microarchitecture fora Supercomputing Quantum Processor, 2017,ACM, pp. 813-825. (Year: 2017).*
Shi, Y. et al., Optimized Compilation of Aggregated Instructions for Realistic Quantum Computers, 2019, ACM, pp. 1031-1044. (Year: 2019).*
Li, J. et al., Simultaneous readout of two charge qubits, 2007, The American Physical Society, Physical Review B 75,pp. 085312-1 to 085312-9. (Year: 2007).*
Reilly, D. J. "Challenges in scaling-up the control interface of a quantum computer." 2019 IEEE International Electron Devices Meeting (IEDM). IEEE, 2019, 6 pages.
Fu et al. "An experimental microarchitecture for a superconducting quantum processor." Proceedings of the 50th Annual IEEE/ACM International Symposium on Microarchitecture. 2017, 13 pages.
Ryan, et al. "Hardware for dynamic quantum computing." Review of Scientific Instruments 88.10 Apr. 28, 2017 (Apr. 28, 2017): 104703, 13 pages.

* cited by examiner

METHODS AND APPARATUS FOR PARALLEL QUANTUM COMPUTING

BACKGROUND

The present disclosure relates to apparatus, systems and methods for parallel quantum computing, and in particular, although not necessarily, for controlling the timing of the application of circuits to qubits within a quantum memory of a quantum computer to improve the throughput of quantum circuits.

SUMMARY

According to a first aspect of the present disclosure there is provided a computer-implemented method for controlling a quantum memory of a quantum computer, the quantum memory comprising a first qubit. The method comprises:
reading a first-machine-language-circuit from a first-machine-language-buffer into a first-implementer, wherein the first-machine-language-circuit comprises:
a first-timestamp;
a first-qubit-identifier unique to the first qubit;
a first-qubit-control-instruction; and
a first-protected-location of a first-classical-register,
reading a first-control-value from the first-protected-location of the first-classical-register into the first-implementer, the first-control-value configured to encode either a first-execute-instruction or a first-alternate-control-instruction, wherein if the first-control-value encodes the first-execute-instruction then:
determining a first-control-circuit for the first qubit based on the first-machine-language-circuit and first-qubit-hardware-information;
reading a first-synchronization-time from a first-clock into the first-implementer; and
comparing the first-synchronization-time with the first-timestamp to determine a first-timing-criterion and when the first-timing-criterion is satisfied sending the first-control-circuit to first-qubit-control-hardware for application to the first qubit.

Optionally, the method may comprise: writing a first-plurality-of-machine-language-circuits, including the first-machine-language-circuit, into the first-machine-language-buffer from a host, wherein each of the first-plurality-of-machine-language-circuits may comprise the first-qubit-identifier unique to the first qubit.

Optionally, the application of the first-control-circuit to the first qubit may be configured to occur between a first-start-time and a first-end-time; and the writing of the first-plurality-of-machine-language-circuits may be configured to occur, at least in part, between the first-start-time and the first-end-time.

Optionally, the first-machine-language-circuit may be quantum-computer-device independent; and the first-qubit-hardware-information may comprise quantum-computer-device specific timing offset information.

Optionally, the first-qubit-control-instruction may be a first-measurement-instruction, and the method may further comprise receiving at the first-implementer, in response to the application of the first-control-circuit to the first qubit, a first-measurement-result from the first qubit and writing the first-measurement-result to a measurement-location in the first-classical-register.

Optionally, the method may comprise writing a converse of the first-measurement-result to a converse-measurement-location in the first-classical-register.

Optionally, the first-qubit-control-instruction may be a first-1-qubit-gate-instruction.

Optionally, the first-1-qubit-gate-instruction may comprise a first-gate-identification-code and the first-implementer may be configured to look-up the first-qubit-hardware-information based on the first-gate-identification-code.

Optionally, the first-qubit-control-instruction may comprise a first-gate-parameter and the first-control-circuit may be based on the first-gate-parameter.

Optionally, the first-qubit-control-instruction may be a first-measurement-instruction, and the method may further comprise: receiving at the first-implementer, in response to the application of the first-control-circuit to the first qubit, a first-measurement-result from the first qubit and writing the first-measurement-result to the host.

Optionally, application of the first-control-circuit to the first qubit may occur between a first-start-time and a first-end-time. The first qubit may be reset after the first-end-time; and a further-circuit of the first-plurality-of-machine-language-circuits may be sent to the first-qubit-control-hardware for application to the first qubit after the reset.

Optionally, if the first-control-value encodes the first-alternate-control-instruction then the method may include configuring the first-implementer to: perform a first-delay; and after the first-delay, check the first-machine-language-buffer for a further-circuit of the first-plurality-of-machine-language-circuits.

Optionally, the quantum memory may comprise a second qubit. The method may comprise:
reading a second-machine-language-circuit from a second-machine-language-buffer into a second-implementer, wherein the second-machine-language-circuit comprises:
a second-qubit-identifier unique to the second qubit
a second-timestamp;
a second-qubit-control-instruction; and
a second-protected-location of a second-classical-register,
reading a second-control-value from the second-protected-location of the second-classical-register into the second-implementer, the second-control-value configured to encode either a second-execute-instruction or a second-alternate-control-instruction, wherein if the second-control-value encodes the second-execute-instruction then:
determining a second-control-circuit for the second qubit based on the second-machine-language-circuit and second-qubit-hardware-information;
reading a second-synchronization-time from a second-clock into the second-implementer; and
comparing the second-synchronization-time with the second-timestamp to determine a second-timing-criterion and when the second-timing-criterion is satisfied sending the second-control-circuit to second-qubit-control-hardware for application to the second qubit.

Optionally, the first-machine-language-circuit may comprises the second-qubit-identifier; and the first-qubit-control-instruction may comprises a two-qubit-gate-control-instruction configured to apply a two-qubit-gate between the first qubit and the second qubit.

Optionally, the first-clock may be synchronized with the second-clock; application of the first-control-circuit to the first qubit may begin at a first-start-time; application of the second-control-circuit to the second qubit may begin at a second-start-time; and a difference between the first-start-time and the second-start-time may be less than a predetermined threshold.

Optionally, the application of the first-control-circuit and the application of the second-control-circuit may comprise application of a two-qubit-gate between the first qubit and the second qubit.

Optionally, the second-qubit-control-instruction may be a second-measurement-instruction, the method further comprising: receiving at the second-implementer, in response to the application of the second-control-circuit to the second qubit, a second-measurement-result from the second qubit and writing the second-measurement-result to the first-classical-register and to the second-classical-register.

Optionally, the method may comprise:
  reading a further-first-machine-language-circuit from the first-machine-language-buffer into the first-implementer, wherein the first-machine-language-circuit comprises:
    a further-first-timestamp;
    the first-qubit-identifier unique to the first qubit;
    a further-first-qubit-control-instruction; and
    the first-protected-location of the first-classical-register,
  reading a further-first-control-value from the first-protected-location of the first-classical-register into the first-implementer, the first-control-value configured to encode either a further-first-execute-instruction or a further-first-alternate-control-instruction, wherein if the further-first-control-value encodes the further-first-execute-instruction then:
    determining a further-first-control-circuit for the first qubit based on the further-first-machine-language-circuit, further-first-qubit-hardware-information and the second-measurement-result;
    reading a further-first-synchronization-time from the first-clock into the first-implementer; and
    comparing the further-first-synchronization-time with the further-first-timestamp to determine a further-first-timing-criterion and when the further-first-timing-criterion is satisfied sending the further-first-control-circuit to the first-qubit-control-hardware for application to the first qubit.

According to a further aspect of the present disclosure there is provided an apparatus configured to control a quantum memory of a quantum computer, the quantum memory comprising a first qubit. The apparatus comprises: a first-classical-register; a first-clock; a first-machine-language-buffer configured to store a first-machine-language-circuit. The first-machine-language-circuit comprises: a first-timestamp; a first-qubit-identifier unique to the first qubit; a first-qubit-control-instruction; and a first-protected-location of the first-classical-register. The apparatus further comprises a first-implementer configured to: read the first-machine-language-circuit from the first-machine-language-buffer; read a first-control-value from the first-protected-location of the first-classical-register, the first-control-value configured to encode either a first-execute-instruction or a first-alternate-control-instruction. If the first-control-value encodes the first-execute-instruction then the implementer is configured to: determine a first-control-circuit for the first qubit based on the first-machine-language-circuit and first-qubit-hardware-information; read a first-synchronization-time from the first-clock; and compare the first-synchronization-time with the first-timestamp to determine a first-timing-criterion and when the first-timing-criterion is satisfied send the first-control-circuit to first-qubit-control-hardware for application to the first qubit.

According to a further aspect of the present disclosure there is provided a computer program product, or a computer readable memory medium, including one or more sequences of one or more instructions which, when executed by one or more processors, cause an apparatus to at least perform the steps of any method disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

DETAILED DESCRIPTION

Quantum processing units (QPUs) are expected to be integrated into a range of computing platforms including high performance computing facilities to provide acceleration to tackle problems that are beyond the reach of current classical computer systems. It is unlikely that there will be a purely quantum computer in the short to medium term because issues relating to memory and long-term data storage make this a problematic prospect. Consequently, algorithms utilizing QPUs will be hybrid in nature, containing a mixture of classical computation and quantum computation.

Figure 1:
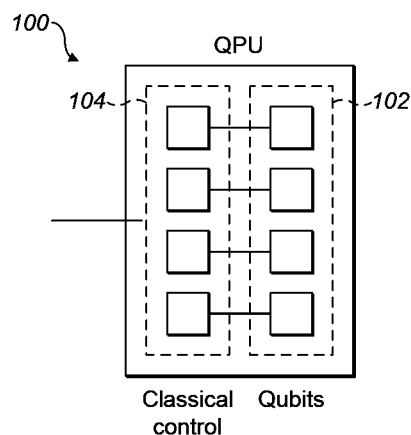
FIG. 1 shows an example of a quantum processor unit.

FIG. 1 shows a QPU 100 that is made up of two parts, the qubits 102 and the classical hardware 104 used to control the qubits 102. The classical control hardware 104 can include waveform generators and classical computational hardware used to control the qubits 102 to implement computations on the qubits 102 by applying circuits to the qubits 102. It will be appreciated that in the context of quantum computing 'circuits' are sequences of control information used to control qubits 102. These sequences may be implemented using pulses of laser light (as in trapped ion quantum computers), pulses of microwave frequency electromagnetic fields (as in superconducting junction quantum computers) or by any other means suitable for the physical platform used to provide the qubits 102.

To implement a computation on the QPU 100, code is loaded onto the classical computational hardware 104 within the QPU 100 and this code is then executed to implement the required pulse sequence, or circuit, to encode and manipulate the data on the qubits 102 and complete the required computation. The I/O (input/output) requirements for controlling the classical hardware 104 interfacing with the qubits 102 mean that the classical computation needs to be spread over multiple hardware units, which in some examples can be a number of field programmable gate arrays (FPGAs).

A key engineering challenge in creating a QPU 100 is the timing requirements for the circuit execution on the qubits 102. Gate times (i.e. the time required to apply a quantum logic gate to a qubit) in superconducting systems can be of the order of 10 nanoseconds and the maximum circuit time (for applying a circuit consisting of a series of gates) as determined by decoherence is on the order of microseconds. Therefore, the ability to carry out useful computation requires that gate execution must be managed in a highly regimented fashion with, in some instances, picosecond precision.

Algorithms that have been proposed for implementation on near term quantum computers included the variational quantum Eigensolver (VQE) and the Quantum Approximate Optimization Algorithm (QAOA). In both examples, the same circuit is implemented many thousands of times on the qubits 102, using a batch size of many thousands of 'shots' or 'samples' for each circuit.

Recent developments in quantum algorithms have led to algorithms that only run each circuit a small number of times, often only once. Examples of this can be found in both highly adaptive algorithms and random compilation algorithms.

In adaptive algorithms a circuit can be updated to take account of the current estimates of a parameter of interest after every shot so as to reduce the computational resources required to obtain a given accuracy. Random compilation is an error mitigation technique which executes a random perturbation of a circuit of interest at each shot to improve the quality of the calculation. This means that rather than running the same circuit a large number of times in a row, a sequence of different circuits each executed perhaps only once needs to be implemented to carry out these types of algorithms. These algorithms utilize less computational resources than earlier approaches to the same problems to obtain the same answer.

Current QPU 100 implementations have been tuned for the execution of large batches of a given circuit and so the current solutions are tuned to work efficiently for running algorithms such as VQE.

Given the strict timing requirements, QPU control systems 104 have typically been designed with two common features regarding how the classical computation is programmed to carry out the required circuit execution. Firstly, programming of the classical computation hardware in the QPU 100 is often relatively slow compared to circuit evaluation time for many qubit types. Secondly, programming of the classical computation in the QPU 100 and circuit execution cannot be carried out in parallel:

known control systems have at minimum 2 behavioral states, "programming" (receiving the circuit needed to manipulate/measure a qubit) and "sampling" (i.e. manipulating/measuring the qubit) that do not overlap in time.

Figure 2:
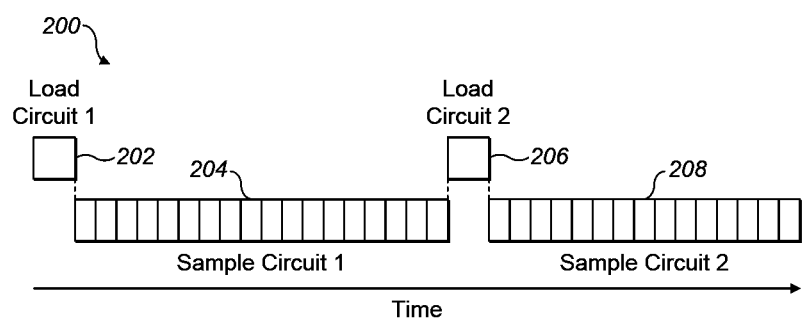
FIG. 2 shows an example of a sequence of the loading and execution of quantum circuits in a quantum computer where each circuit is executed multiple times.

FIG. 2 shows a schematic timing diagram 200, in which time runs from left to right, for loading and sampling quantum circuits, where each circuit is sampled multiple times. A first circuit is loaded during a first time interval 202. After the first time interval 202, the first circuit is then sampled a plurality of times over the course of a second time interval 204. After the second time interval 204, a second circuit, different than the first circuit, is loaded during a third time interval 206. After the third time interval 206 the second circuit is sampled a plurality of time over the course of a fourth time interval 208. This method works well for large batch sizes where each circuit is sampled a large number of times and provides a relatively easy engineering challenge in implementation.

Figure 3:
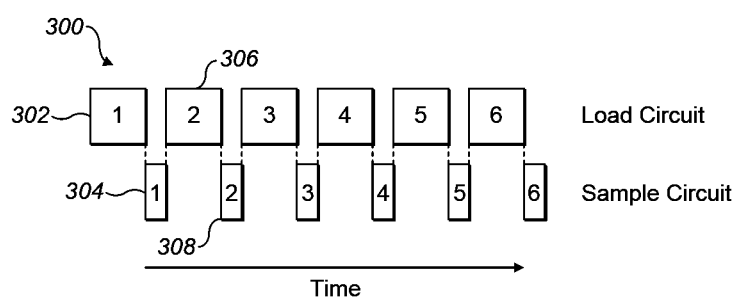
FIG. 3 shows an example of a sequence of the loading and execution of quantum circuits in a quantum computer where each circuit is executed once only.

FIG. 3 shows a schematic timing diagram 300, similar to that of FIG. 2, for the loading and sampling of quantum circuits, where each circuit is sampled only once. A first circuit is loaded during a first time interval 302 and then subsequently sampled/executed during a second time interval 304. After the second time interval 304 a second circuit is loaded during a third time interval 306 and then subsequently sampled/executed during a fourth time interval 308. This pattern of loading then sampling/execution can be repeated as many times as there are circuits to execute. As can be seen from FIG. 4, this method leads to relatively poor qubit utilization when used for algorithms that require a sequence of different circuits to be run each a single time. This arises because of the down time while the control program/circuit is loaded onto the local computation hardware.

Quantum control systems have been developed that provide technologies for expressing longer circuits, running feedforward operations quickly, or for using distributed systems to drive many qubits. In many control systems, waveforms are stored in a waveform buffer, which can be accessed to construct a circuit to run directly on a qubit. The waveforms are stored, in general, as a sequence of samples that are copied directly to a digital-analog convertor block for output. Generally, qubit control hardware is available that can trigger any gate from a sufficiently large set of waveforms with deterministic latency, using known methods.

Parameterized synthesis has been proposed to enable arbitrary gate waveforms with much reduced storage requirements compared to a raw waveform description. The present disclosure is not specific to a given form of gate specification, other than via the use of a compact representation (including indexing and parameterization as described below) to enable greater circuit throughput within limited host/control system bandwidth.

The growing size of QPUs and the number of qubits that need to be controlled has led to the need to use multiple classical computational devices controlling the qubit control hardware to have enough I/O bandwidth to enable communication between both the qubits and a host that provides overall control of the quantum computer.

Feedforward operation using a machine language can be implemented, either using a centralized control unit that receives measurement results and emits steering information, or independent control flow can be implemented in a distributed system. Some examples use a central control unit that distributes control flow information over a network and while other may use a system based on local control flow in each element of the distributed control system. The present disclosure is relevant to both of these possibilities by using a high-precision shared timing source to enable local control flow decisions.

Control system implementations can ensure high precision timing using clock networks, but two challenges have been identified. The first is that the clock network may provide excellent accuracy, but poor precision because of, for example, variable length trigger cabling. This results in trigger jitter, and if two qubits are interacting, this jitter limits the fidelity of a 2-qubit gate. Secondly, the unreliability and cost of clock cabling means the clock network approach scales poorly as the size of the system grows. Synchronization via a networked protocol may be possible to solve these issues but has not been implemented yet.

There is a need for systems that allow high throughput in the execution of different circuits with low batch size. Existing systems that do not provide a capability to load the circuits into the QPU classical control hardware without pausing circuit execution are problematic. The present disclosure provides the infrastructure to allow streaming of circuits without the need to pause execution, while still providing the ability to execute circuits across multiple classical control devices, with classical feedforward whenever required. As such, this provides for important improvements in the efficiency of hardware utilization for quantum computing.

The present disclosure provides a solution to the problem of how to increase qubit utilization for algorithms with low batch size. This solution has a number of component parts, which enable the execution of a stream of circuits on qubits controlled by multiple classical computational units. In this disclosure the extreme case, where each classical computational unit controls only the hardware associated with a single qubit, is described. However, it will be appreciated that this can be generalized to the case where a single classical computational unit can control multiple qubits.

Figure 4:
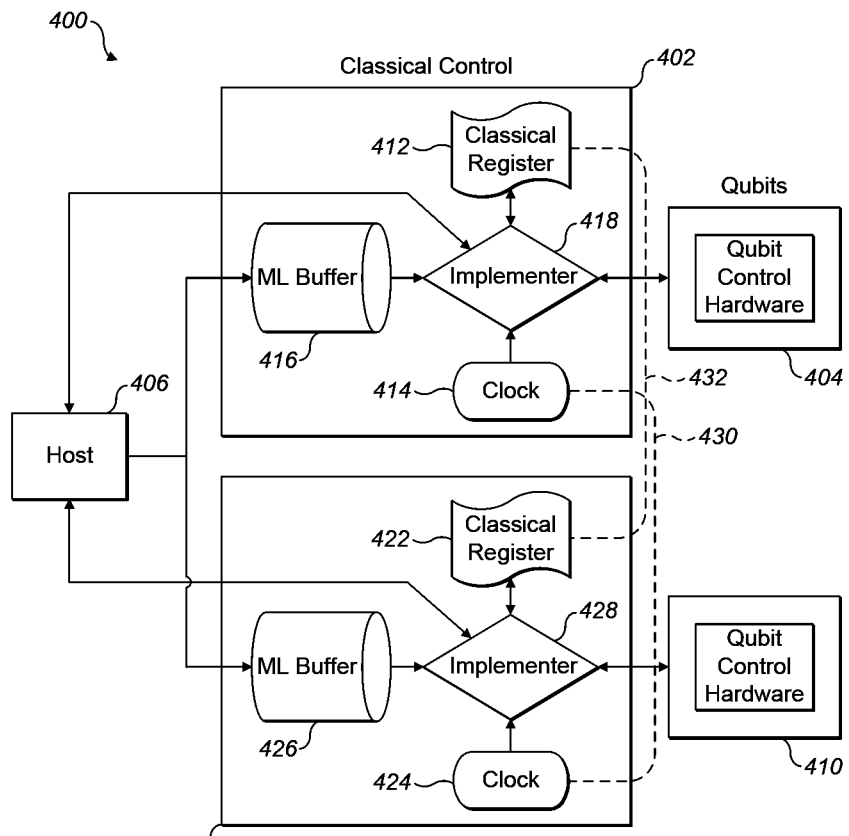
FIG. 4 shows an example embodiment of an apparatus for using Machine Language circuits to control qubits of a quantum computer.

FIG. 4 shows an apparatus 400 designed to control a quantum memory of a quantum computer. This apparatus 400 may thus form part of a QPU. A quantum memory, or quantum register, can comprise a plurality of qubits including a first qubit (not shown). The apparatus 400 has a first classical control block 402 connected to first-qubit-control-hardware 404 and a host 406. The apparatus also has a second classical control block 408, similar to the first classical control block 402, that is connected to both second-qubit-control-hardware 410 and also to the host 406. The host 406 provides control signaling to all classical control blocks of which only the first 402 and second 408 are shown (it will be appreciated that any number of additional classical control blocks may be included). The host 406 is also designed to receive measurement values (or results) from the qubits via the classical control blocks 402, 408 (specifically from the implementer in any given classical control block), as discussed below.

The first-404 and second-qubit-control-hardware 410 is configured to be operatively coupled to a first qubit and a second qubit respectively (not shown). It will be appreciated that this apparatus 400 can be used with any type of physical qubit, irrespective of the particular implementation details (trapped ion, superconducting junction, etc.) which will not be discussed here.

The first classical control block 402 has a first-classical-register 412, a first-clock 414, a first-machine-language-buffer 416, and a first-implementer 418. The first-implementer 418 is connected to each of the first-classical-register 412, the first-clock 414, the first-machine-language-buffer 416 and the first-qubit-control-hardware 404.

The first-machine-language-buffer 416 is a memory module designed to store machine-language-circuits, such as a first-machine-language-circuit, that are examples of a semi-abstract machine language that can be used to program the classical control blocks 402, 408 of a QPU. Generally, a machine-language-circuit includes information necessary to generate a quantum circuit for application to a particular qubit, such as the first qubit, and can also include instructions required to implement feedforward logic. Significantly, machine-language-circuits are 'device-agnostic' (or device independent) in that they can be used with any physical qubit implementation, and thus need to be supplemented with device specific information (such as device specific timing offset information) to generate a specific quantum circuit suitable for application to any specific physical qubit.

The first-machine-language-circuit includes a first-qubit-identifier, a first-timestamp, a first-qubit-control-instruction, and a first-protected-location of the first-classical-register. The first-qubit-identifier is unique to the first qubit and can thus ensure that the first-machine-language-circuit is sent to the correct first classical control block 402 that is connected to the first qubit via the first-qubit-control-hardware 404. The first-timestamp includes information that defines when the quantum circuit generated from the first-machine-language-circuit should be applied to the first qubit; the time-coordination between different classical control blocks is a key feature of this technology. The first-qubit-control-instruction provides information about what the quantum circuit should do to the first qubit, such as applying a particular quantum logic gate to the first qubit or measuring the state of the first qubit. The first-protected-location of the first-classical-register 412 is used to store control information that determines whether any given machine-language-circuit should be executed, delayed, discarded or subject to some other action.

The machine-language-circuits can describe any or all of the following logical constructs: gate waveforms, logical quantum operations, measurements, timing or synchronization barriers, and control flow instructions. In the present disclosure a simple language is described, but it will be appreciated that this could be easily augmented to accommodate the above, or other additional, features. The only control flow structure considered here a conditional If statement that depends on the measurement of a specified qubit, as described further below.

The machine-language-circuits can produce a collection of streams of instructions, one stream for each qubit, which encode the actions to be carried out on that particular qubit. As discussed further below, it is significant that 2-qubit gates can be split into the actions to be carried out on each of the two qubits involved and if these commands are carried in an appropriately timed manner then this can implement a 2-qubit gate.

If all qubits are controlled by a single classical computational unit, then synchronization can be achieved trivially by reading instructions using the same clock. Synchronization operations can also be elided if a sequence of 2-qubit gates is enacted by implementers that share a reference clock where the reference clock is not subject to any significant drift.

Since machine-language-circuits are device-agnostic, they can avoid the need to encode control-system specific delays for synchronization into waveforms used to make up the quantum circuits. The delays to compensate for timing offsets, variable length signal cables, etc. are stored in the classical control blocks 402, 408 and can be combined with the machine-language-circuits by an implementer 418 to create the required quantum circuits.

The first-implementer 418 is designed to read the first-machine-language-circuit from the first-machine-language-buffer 416. This action provides the first-implementer 418 with access to the first-protected-location of the first-classical-register 412. This enables the first-implementer 418 to read a first-control-value from the first-protected-location. The first-control-value can encode either a first-execute-instruction (which could be a "1", for example) or a first-alternate-control-instruction (which could be a "0", for example). The first-alternate-control-instruction can be an instruction to delay execution of the first-machine-language-circuit, or simply to discard the first-machine-language-circuit. However, if the first-control-value encodes the first-execute-instruction then the first-implementer 418 is designed to determine a first-control-circuit for the first qubit based on the first-machine-language-circuit and first-qubit-hardware-information. The first-qubit-hardware-information includes the information (such as delay/timing information that is specific to the first qubit) needed to convert the information included in the first-machine-language-circuit (particularly the first-qubit-control-instruction) into a first-control-circuit for application to the first qubit. The first-implementer 418 can then read a first-synchronization-time from the first-clock 414. This enables the first-implementer 418 to compare the first-synchronization-time with the first-timestamp to determine a first-timing-criterion. When the first-timing-criterion is satisfied, (such as when the first-timestamp matches a reading from the first-clock 414, for example) the first-implementer 418 can send the first-control-circuit to the first-qubit-control-hardware 404 for application to the first qubit. In this way, the semi-abstract and device-agnostic information contained in the first-machine-language-circuit can be converted into the actual control pulses that make up the first-control-circuit for manipulating the first qubit and the first qubit can thereby be manipulated as desired.

Generally, any implementer will contain timing logic that allows for timing barriers in a machine-language-circuit to be accounted for so as to enable the execution of 2-qubit gates with the required timing precision. An implementer will also receive broadcast signals from other distributed devices (i.e. other classical control blocks), to support memory synchronization barriers in the machine-language-circuit allowing the implementation of if/else logical control structures. Generally, implementers are responsible for introducing hardware specific adjustments, including but not exclusively delays due to timing offsets, variable length signal cables etc. or any other hardware specific factors that can influence the time required to communicate control signaling/circuits between a classical logic block and any qubits that the classical logic block controls. Furthermore, any implementer may be able to read any of a first-plurality-of-machine-language-circuits written, by the host, into the machine-language-buffer. Each of the first-plurality-of-machine-language-circuits can include the first-qubit-identifier unique to the first qubit since each of circuit of this plurality is intended for application to the first qubit.

The second classical control block 408 contains components that are similar in functionality to those of the first classical control block 402 and have been given similar reference numerals. When considered individually, the second classical control block 408 functions in the same way at the first classical control block 402, and will not therefore be described further in this individual regard. However, these two classical control blocks 402, 408 are also configured to communicate and co-ordinate with each other such that they can implement, among other things, 2-qubit gates that can be executed between the first and second qubits, as described further below.

For control systems (such as that shown in FIG. 4) consisting of a plurality of classical computational control blocks 402,408, a timing synchronization network 430 is required to enable the execution of 2-qubit gates due to the precision timing requirements. Precision of the order 1% or better of the gate time length is typically required. For some devices, such as superconducting junction based quantum computers, the requirement can be that the timing jitter is of the order of no more than 10's of picoseconds.

This timing precision enables two independent control systems to implement the 2-qubit gate by simultaneously issuing the required pulse sequences or circuits. It is significant that no communication is required between the two pieces of control hardware (e.g. between the first classical control block 402 and the second classical control block 408) just simultaneous action by the two respective control blocks is required.

The timing synchronization network 430 (the dashed line between the first-clock 414 and the second-clock 424) provides low jitter relative time information to all devices in the network, and the communication of synchronization information with deterministic delay and low jitter. To achieve the required level of precision, a number of solutions have been developed to enable this timing synchronization, for example for FPGAs (Field Programmable Gate Arrays) the CERN 'White Rabbit project'.

To enable the simple feed forward control logic needed in a number of cutting-edge quantum applications a measurement result from one qubit needs to be accessible by the control hardware for all qubits of a quantum computer. If only a single piece of control hardware is used this need is readily provided for by having a jointly accessible classical register. Unfortunately, the timing requirements of the QPU means that a shared memory system does not work well for distributed control systems, as there will generally be unpredictable contention on the shared memory controller resulting in timing jitter.

Therefore, the classical information needed to determine control flow must be stored locally, and updates resulting from measurements must be pushed to each device in the control system via a classical-broadcast-network 432. For example, once the first-implementer 418 has provided the first-control-circuit, where this circuit is configured to measure the first qubit, the first-qubit-control-hardware 404 may receive a first-measurement from the first qubit and provide that information to the first-implementer 418. In turn the first-implementer 418 may write the first-measurement (or information representative of the first-measurement) to the first-classical-register 412. Further, the first-implementer 418 may also provide the first-measurement (or information representative of the first measurement) via the classical-broadcast-network 432 to (at least) the second-classical-register 422 where it can be stored for subsequent access by the second-implementer 428. Similarly, second-qubit-measurements from the second qubit may be sent via the classical-broadcast-network 432, by the second-implementer 428, to the first-classical-register 412 for storage and subsequent access by the first-implementer 418.

In some examples, an implementer may not only store the measurement result in the classical registers, but may also store the converse (or negation) of the result in a converse-measurement-location of any or each of the classical registers. That is, if the measurement is a "1" then the implementer may store the converse, which is a "0", while if the measurement is a "0" then the implementer may store the converse, which is a "1". This enables machine code to operate on the basis of the converse result of the measurement without needing to compute the converse, which can enable the machine code to be more compact and efficient.

In some examples the synchronization network 430 used for timing may additionally communicate qubit measurement results enabling distributed implementer blocks to branch on measurement results received from another implementer.

The protected-location in any classical-register may be a '0' location and may contain the value 1 when the control-value encodes an execute-instruction. This can be used by a machine-language program to unconditionally run/disable a gate (where disabling the gate may be achieved by setting the '0' location to a value of '0' to encode an alternate-control-instruction, such as a disable instruction). Classical registers are replicated at least once within each classical control block, to allow the respective implementers fixed-latency access to the elements of the respective classical register. This is required to prevent stalls in the application of gates, that would desynchronize the instruction streams. As the implementers access their respective classical registers without any delay mechanism, the relatively simple case of ensuring the values in the register are up to date can be the responsibility of the relevant machine-language-circuit.

When a qubit measurement occurs, the result can be transmitted on the classical broadcast network 432. This network 432 either has fixed latency or is sufficiently fast that under any reasonable packet loss scenario the message containing the measurement will meet the required deadline with probability high enough to not contribute significantly to the quantum computer's failure rate. The machine-language program can provide sufficient time between measurement and dependent instructions, to allow for this fixed distribution latency. This can be achieved in various different ways, such as by reordering gates, inserting identity operations, or incrementing the timestamp of the conditional gate, for example.

The synchronization of the clocks within each classical computational block means that all classical computational blocks can be kept within step with each other allowing this simple solution to work. It will be appreciated that more robust alternative solutions could readily be integrated to provide this service to the implementers.

Figure 5:
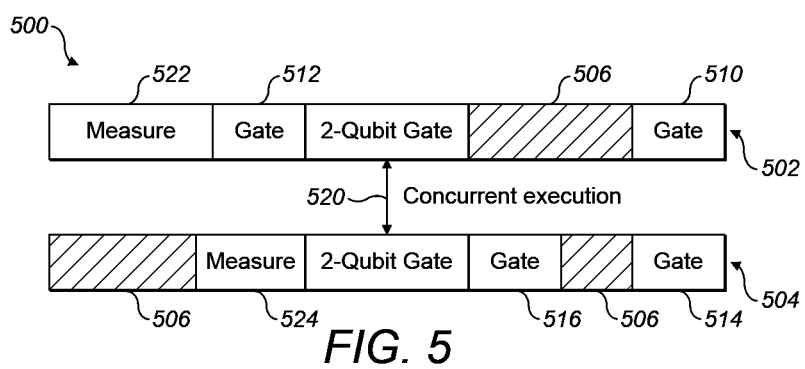
FIG. 5 shows an example embodiments of a pair of circuit sequences including a 2-Qubit Gate executed between a pair of qubits.

FIG. 5 shows a schematic timing diagram 500 for the execution of a 2-qubit gate between a first qubit and a second qubit. Operations performed on the first qubit are shown in an upper panel 502 while operations performed on the second qubit are shown on a lower panel 504. In this diagram, time runs from right to left. Cross-hatched areas of the panels 506 represent periods of the time when the qubits are not being actively manipulated.

The first qubit is manipulated by application of a first-single-qubit-gate 510 and a second-single-qubit-gate 512 at a subsequent time. The second qubit is manipulated by a third-single-qubit-gate 514 and a fourth-single-qubit-gate 516. Crucially, a 2-qubit-gate 520 is executed between the first and second qubits by application of suitable control pulses to the first qubit and application of suitable control pulses to the second qubit sufficiently simultaneously. This concurrent execution provides for the functionality of the 2-qubit gate. After all of the gate executions have been completed, the first qubit is subject to a first-qubit-measurement 522 and the second qubit is subject to a second-qubit-measurement 524. In this way, a calculation including a 2-qubit gate can be executed without information being exchanged between the two distinct classical control blocks that each control only their respective first and second qubits, provided the two classical control blocks are sufficiently well synchronized to enable concurrent application of the required control pulses to the qubits. Here, the property of being sufficiently well-synchronized means that the application of the first-control-circuit to the first qubit begins at a first-start-time, while the application of the second-control-circuit to the second qubit begins at a second-start-time and a difference between the first-start-time and the second-start-time is less than a predetermined threshold. This predetermined threshold will, of course, depend on the particular hardware implementation of the qubits, but may be of the order of less than 10 picoseconds in superconducting junction systems, for example.

The observation that enables the successful separation of the control of the two qubits involved in the execution of a 2-qubit gate is that the implementation of 2-qubit gates across different qubit technologies is an open control process, i.e. that the process to execute a 2-qubit gate is a predetermined sequence of events and no feedback is needed during its execution. The key issue is the timing of the events (control pulses); as long as a common clock exists there is no need for communication between the classical control blocks for the two separate qubits.

It will be appreciated that if two implementers are situated on the same classical computational block within the QPU they can share a single clock which can be used for the implementation of the 2-qubit gates. However, for a QPU containing multiple classical computational blocks a system needs to be used to provide a synchronized clock across the classical computational blocks with, in some implementations, picosecond precision in a distributed fashion. It is significant that the accuracy of the clocks does not matter; the key requirement is that the clocks all agree on the time to a sufficiently high precision. A number of technologies have been developed to deliver this level precision in a distributed fashion, such as the CERN 'White Rabbit project', for example. This enables implementation of 2-qubit gates as the coordinated action on both qubits involved in the gate only requires coordination being provided by the synchronized clocks.

Figure 6:
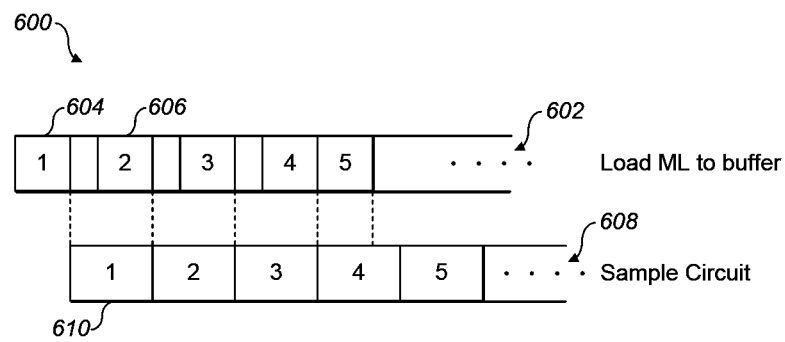
FIG. 6 shows an example embodiment of a sequence of parallel loading and execution of quantum circuits in a quantum computer where each circuit is executed once only.

FIG. 6 shows a schematic timing diagram 600 for parallel loading and execution of a plurality of different circuits. An upper panel 602 shows the timing for the loading of machine-language-circuits into a machine-language-circuit-buffer. A lower panel 608 shows the timing for the sampling (or measurement) of machine-language-circuits loaded according to the timing scheme of the upper panel 602. The upper panel 602 shows that a first circuit is loaded during a first time 604, while a second circuit is loaded during a subsequent second time 606 while further circuits are then loaded thereafter. The first circuit is then executed 610 (or sampled) between a first-start-time and a first-end-time. Crucially, the second circuit is written into the machine-language-buffer, at least in part, during the period of time 610 between the first-start-time and the first-end-time while the first circuit is being executed. This parallel processing, whereby machine-language circuits are loaded while other circuits are being executed provides for superior utilization of the quantum memory resources. As can be seen from FIG. 6, any number of machine-language-circuits can be loaded successively, while previously loaded circuits are being executed concurrently with the loading process to provide for improved resource usage (i.e. improved throughput of circuits).

Figure 7:
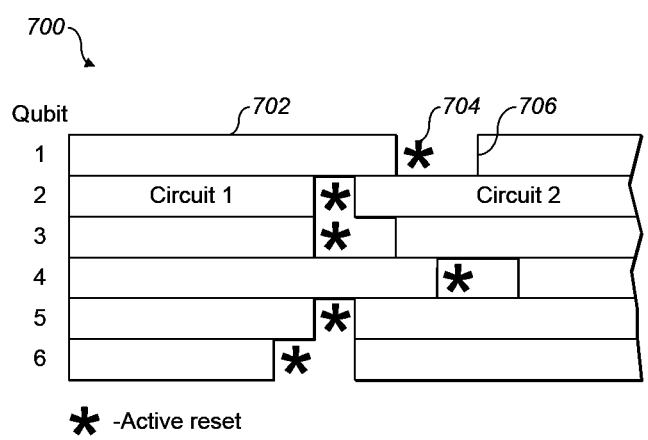
FIG. 7 shows an example embodiment of interleaving of multiple circuit executions on a plurality of qubits.

FIG. 7 shows a schematic timing diagram 700 for the operation of a multi-qubit quantum memory. This shows that circuits can be easily interleaved such that once a qubit is no longer required in a computation for a given circuit it can immediately be reset, using active or passive reset methods, and it can then be possible to start executing the next circuit on that qubit. Note, the passive reset of a qubit simply refers to the qubit naturally 'resetting' via the decoherence process that will occur after sufficient time has elapsed.

For example, a first-control-circuit is executed on a first qubit between 702 a first-start-time and a first-end-time. The first qubit is then subject to an active reset 704. After the reset 704 is complete, a further-circuit is sent by the first qubit control hardware to the first qubit for execution beginning at a second-start-time 706. In this way, different qubits may complete execution of the first-control-circuit at different times and therefore begin execution of the further-circuit, which may be a second-circuit, at different times, such that overall resource usage is improved by reducing the amount of time that any particular qubit is idle.

The following sections provide further details about the machine language, machine-language-circuits and implementers of the present disclosure. An example specification of the machine language is disclosed herein, together with a description of an associated implementer, the interconnection to a qubit and the wider system.

The machine language will often be a sequence of fixed-length instructions; however, a variable-length instruction encoding is also possible. There are three types of instructions in this simple language: 1-qubit gate instructions; 2-qubit gate instructions; and measurement instructions.

Common features across all types of instructions include the following.
 A qubit identifier upon which the command should be enacted. Note that this piece of information is used by the host to route the instruction to the correct machine-language-buffer as each qubit can have its own buffer.
 The timestamp which specifies at what time the relevant control sequence should be triggered on the qubit.
 A protected register location to check if the command should be executed, if the register contains a value "1", for example, the instruction should be executed otherwise it may be discarded. This enables the implementation of feed forward logic in circuits by allowing measurements to broadcast results to the register.
For both the 1- and 2-qubit gates this is augmented with the following information:
 A gate ID, which is used by the implementer to lookup the correct control sequence for the gate to be executed on the particular qubit concerned.
 Gate parameters, which are used to adjust the control sequence in a predetermined fashion, for example to specify the exact rotation to be executed for a rotation gate. This may be in an abstract format (rotation angle in units of pi) or may be hardware specific (for example pulse length, or spline parameters).
For 2-qubit gates only, the qubit ID for the second qubit on which the gate acts is also included in the machine-language-circuit.

For a measurement instruction the common information is augmented with two classical registry locations, the first used to store a 1 or 0 directly recording the measurement result and the second is used to store the converse of this, i.e. if a 1 is measured a 0 is stored in this second location and vice versa.

The machine-language-buffer should be designed such that a machine-language-circuit can be read, on average, faster than the average gate length (i.e. gate execution time) to avoid underflow. The implementer can additionally employ prefetching to avoid underflow.

The required behavior of the implementer for the 3 types of instructions is now presented in further detail.

For all instructions the implementer firstly accesses the specified protected classical register location and if the entry is 1 it continues otherwise it discards the instruction and restarts the process.

If the instruction is a gate instruction, the implementer uses the gate ID in conjunction with a preloaded lookup table to retrieve the correct control signals to execute that gate. Then this control sequence is adjusted in a pre-specified way by the gate parameters, including for the 2-qubit gate the qubit ID of the second qubit. Then the synchronized clock is used to trigger this predefined control sequence at the time specified within the timestamp instruction.

If the instruction is a measurement instruction, then the measurement control sequence is loaded. Then the synchronized clock is used to trigger this predefined control sequence at the time specified within the timestamp instruction. Once the measurement result is obtained it is returned to host in addition to being broadcast to the specified location in all the classical registers and the negation of the result can also be broadcast to the second specified location in all the classical registers.

The following provides a specific example set of machine language instructions for application on qubit 1:
 1. Qubit ID: 1, Register: 0, Gate ID: Rotation Z, Parameter: 32, Time: 40
 2. Qubit ID: 1, Register: 0, Gate ID: CNOT, 2nd Qubit ID: 5, Time: 50
 3. Qubit ID: 1, Register: 0, Measurement Register: 1, Negation Register: 2, Time: 60
 4. Qubit ID: 1, Register: 1, Gate ID: Rotation X, Parameter: 45, Time: 70
 5. Qubit ID: 1, Register: 2, Gate ID: Rotation Y, Parameter: 45, Time: 70

The first instruction encodes a single qubit gate comprising a simple Z rotation. The second instruction encodes a 2-qubit gate (a CNOT gate) between qubit 1 and qubit 5. The third instruction encodes a measurement, with the result stored at register position 1 and the complement of the result stored at register position 2. The fourth and fifth instructions encode single qubit gates that comprise simple X and Y rotations respectively.

Figure 8:
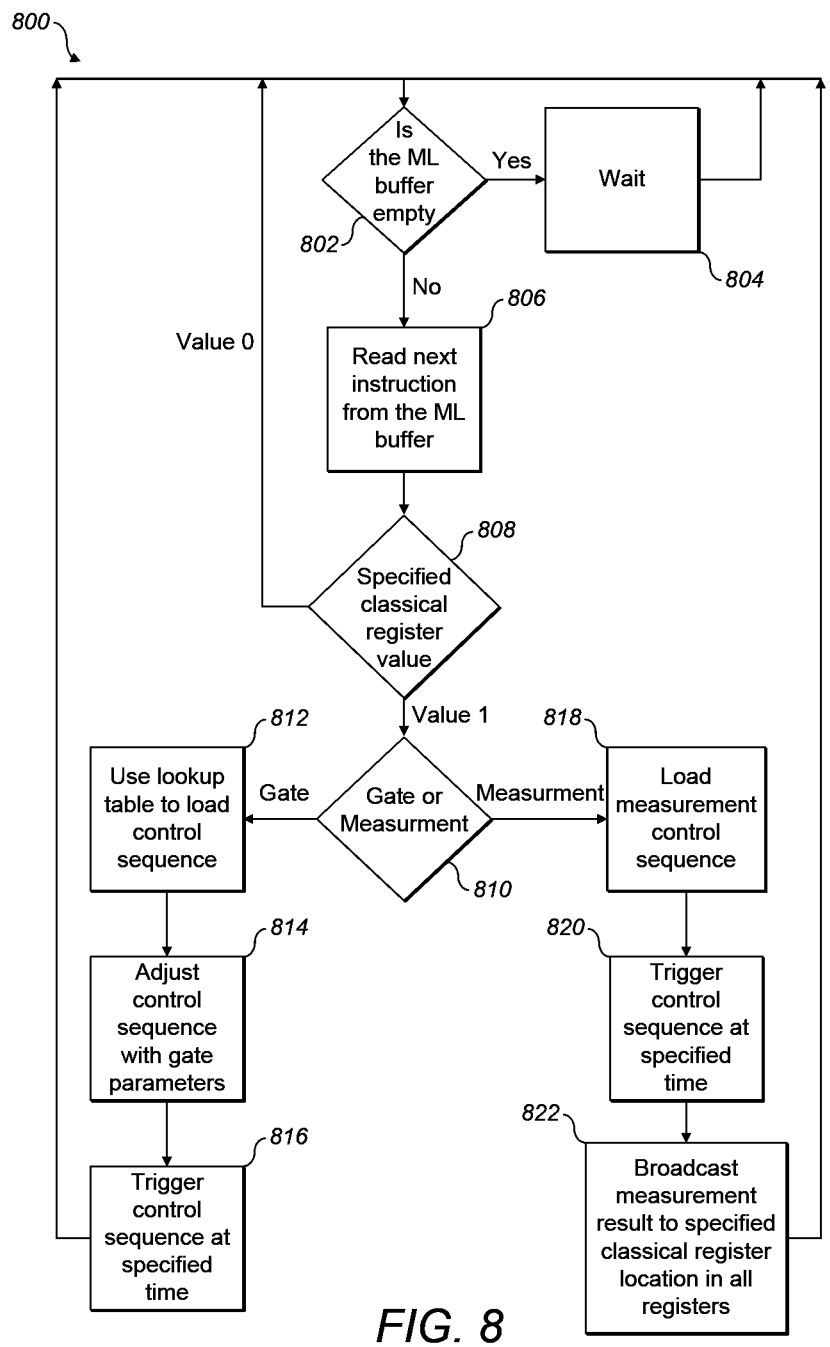
FIG. 8 shows an example embodiment of a flow diagram of method for the operation of the apparatus of FIG. 4.

FIG. 8 shows a flow chart of a method 800 for controlling a qubit of a quantum computer memory. The method 800 provides a simple example of a process for controlling a qubit and it will be appreciated that other more complex processes, consistent with the present disclosure, are also possible. The method 800 begins at a first step 802 where a machine-language-buffer is interrogated to determine whether it contains any machine-language-circuits. If no circuits are present in the machine-language-buffer, then the method 800 proceeds to a delay step 804 and after a delay-time-interval the method 800 returns to the first step 802 again.

If the machine-language-buffer does contain at least one machine-language-circuit then the method 800 proceeds to a read-step 806 where the machine-language-circuit (which may be a first-machine-language-circuit) is read from the machine-language-buffer into an implementer. The information content of the machine-language-circuit is then examined 808 by the implementer to identify the protected-location of a classical register which is read to determine whether it encodes a control-value that is either an execute instruction of an alternate control instruction. In this example, the alternate control instruction is encoded as a "0" and when this "0" is present in the protected-location, the method 800 returns to the first step 802.

When the protected-location contains a "1" (which in this example encodes an execute instruction) then the method 800 proceeds to a qubit-control-instruction determination step 810, in which the nature of the qubit-control-instruction contained in the machine-language-circuit is determined. If the qubit-control-instruction is a gate instruction, then the method proceeds to a first gate step 812 where the implementer uses a look-up table (or any similar approach, such as a database) to read the sequence of control pulses that are needed to implement the required gate, specified by the qubit-control-instruction, on the particular qubit. Since the control pulses are specific to the qubit that is uniquely identified by the machine-language-circuit, they will be configured with timing information that is specific to that qubit, which will depend on the precise time required to communicate the control pulses to that qubit, which may vary appreciably compared to other qubits that may be located nearby, but which may be connected by different lengths of cable, or other types of communication line.

The particular sequence of control pulses needed to implement the required type of gate on the relevant qubit can then be adjusted at a gate-adjustment step 814, to account for the specific gate parameters, such as specific rotation angles, for example. Generally, a qubit-control-instruction can include a qubit-gate-instruction which identifies the particular type of quantum logic gate that is to be applied to the relevant qubit by way of a gate-identification-code. This gate-identification-code can enable the relevant implementer to look up (via a look-up table or similar memory) the appropriate qubit-hardware-information to obtain the relevant sequence of control pulses needed to apply the desired type of quantum logic gate to the particular qubit. The sequence of control pulses can then be modified, if required, to encode a gate-parameter (such as a particular rotation angle) required to generate the relevant control-circuit for application to the qubit.

The method 800 then proceeds to a gate trigger step 816, where the timestamp from the machine-language-circuit is used to determine the time required to apply the control pulses to the relevant qubit by comparing the timestamp to a synchronization-time read from clock contained within the same classical computation block as the implementer. At the appropriate time, the relevant control-circuit is sent to the relevant qubit control hardware for application to the qubit in question. The method 800 then returns to the first step 802, to repeat the process as may be required.

Alternatively, the qubit-control-instruction may be a measurement instruction, in which case the method proceeds from the qubit-control-instruction determination step 810 to a first measurement step 818 in which the implementer loads the control pulses (from a look-up table, or similar memory) required to execute the measurement on the relevant qubit. By comparing the timestamp from the machine-language-circuit with a synchronization time from the relevant clock, a trigger measurement step 820 can send the measurement circuit to the relevant qubit control hardware at the appropriate time to execute the required measurement.

The measurement is then returned to the implementer, which can store the result of the measurement in the classical register contained within the same classical computational block as the implementer and also broadcast 822 the measurement over the classical broadcast network to enable storage of the result of the measurement in each of the other classical registers contained in each of the other classical computation blocks that make up the system. In some examples, the implementer may also send the result of the measurement to a host. After the measurement has been broadcast, the method 800 then returns to the first step 802, to repeat the qubit control process as may be required.

The above disclosure provides a solution to the problems of maintaining throughput under small circuit batch sizes and the problem of device specificity at the machine-language level. The throughput improvement is produced by allowing the host to copy multiple machine-language-circuits into the machine-language-circuit-buffer of each classical computational block and allowing this copy process to happen concurrently with the implementer executing machine-language circuits.

Additionally, by allowing for logical operations, waits, and control flow to be expressed directly in the machine-language the size of a given circuit expressed in the machine-language is significantly reduced compared to the same circuit expressed as a waveform. This higher level expression of the machine-language-circuit (as opposed to raw waveforms) allows for a deeper buffers to improve throughput and device-agnostic timing corrections, which advantageously improving portability of the control system between different physical quantum computing platforms.

It will be appreciated that methods disclosed herein can be implemented by computer. The computer implementation may be by a classical (or digital) computer that controls the QPU and thereby controls the application of circuits to the qubits of the QPU.

Figure 9:
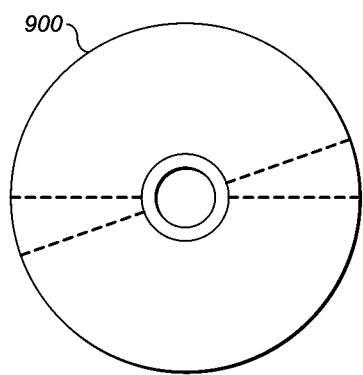
FIG. 9 shows an example embodiment of a computer program product.

FIG. 9 shows an example computer program product 900 (equivalently, a computer readable memory medium) that contains instructions that, when executed, cause an apparatus, as described in relation to FIG. 4, to at least perform steps of any of the methods described herein.

The invention claimed is:

1. A computer-implemented method for controlling a quantum memory of a quantum computer, the quantum memory comprising a first qubit, the method comprising:
   reading a first-machine-language-circuit from a first-machine-language-buffer into a first-implementer, wherein the first-machine-language-circuit comprises:
   a first-timestamp;
   a first-qubit-identifier unique to the first qubit;
   a first-qubit-control-instruction; and
   a first-protected-location of a first-classical-register,
   reading a first-control-value from the first-protected-location of the first-classical-register into the first-implementer, the first-control-value configured to encode either a first-execute-instruction or a first-alternate-control-instruction, wherein if the first-control-value encodes the first-execute-instruction then:
   determining a first-control-circuit for the first qubit based on the first-machine-language-circuit and first-qubit-hardware-information;
   reading a first-synchronization-time from a first-clock into the first-implementer; and comparing the first-synchronization-time with the first-timestamp to determine a first-timing-criterion and when the first-timing-criterion is satisfied sending the first-control-circuit to first-qubit-control-hardware for application to the first qubit.

2. The method of claim 1, further comprising: writing a first-plurality-of-machine-language-circuits, including the first-machine-language-circuit, into the first-machine-language-buffer from a host, wherein each of the first-plurality-of-machine-language-circuits comprises the first-qubit-identifier unique to the first qubit.

3. The method of claim 2, wherein:
the application of the first-control-circuit to the first qubit is configured to occur between a first-start-time and a first-end-time; and
the writing of the first-plurality-of-machine-language-circuits is configured to occur, at least in part, between the first-start-time and the first-end-time.

4. The method of claim 1, wherein:
the first-machine-language-circuit is quantum-computer-device independent; and
the first-qubit-hardware-information comprises quantum-computer-device specific timing offset information.

5. The method of claim 1, wherein the first-qubit-control-instruction is a first-measurement-instruction, the method further comprising:
receiving at the first-implementer, in response to the application of the first-control-circuit to the first qubit, a first-measurement-result from the first qubit and writing the first-measurement-result to a measurement-location in the first-classical-register.

6. The method of claim 5, further comprising writing a converse of the first-measurement-result to a converse-measurement-location in the first-classical-register.

7. The method of claim 1, wherein the first-qubit-control-instruction is a first-1-qubit-gate-instruction.

8. The method of claim 7, wherein the first-1-qubit-gate-instruction comprises a first-gate-identification-code and the first-implementer is configured to look-up the first-qubit-hardware-information based on the first-gate-identification-code.

9. The method of claim 8, wherein the first-qubit-control-instruction comprises a first-gate-parameter and the first-control-circuit is based on the first-gate-parameter.

10. The method of claim 2, wherein the first-qubit-control-instruction is a first-measurement-instruction, the method further comprising:
receiving at the first-implementer, in response to the application of the first-control-circuit to the first qubit, a first-measurement-result from the first qubit and writing the first-measurement-result to the host.

11. The method of claim 2, wherein
application of the first-control-circuit to the first qubit occurs between a first-start-time and a first-end-time;
the first qubit is reset after the first-end-time; and
a further-circuit of the first-plurality-of-machine-language-circuits is sent to the first-qubit-control-hardware for application to the first qubit after the reset.

12. The method of claim 2, wherein if the first-control-value encodes the first-alternate-control-instruction then configuring the first-implementer to:
perform a first-delay; and
after the first-delay, check the first-machine-language-buffer for a further-circuit of the first-plurality-of-machine-language-circuits.

13. The method of claim 1, wherein the quantum memory comprises a second qubit, the method comprising:

reading a second-machine-language-circuit from a second-machine-language-buffer into a second-implementer, wherein the second-machine-language-circuit comprises:
a second-qubit-identifier unique to the second qubit
a second-timestamp;
a second-qubit-control-instruction; and
a second-protected-location of a second-classical-register,
reading a second-control-value from the second-protected-location of the second-classical-register into the second-implementer, the second-control-value configured to encode either a second-execute-instruction or a second-alternate-control-instruction, wherein if the second-control-value encodes the second-execute-instruction then:
determining a second-control-circuit for the second qubit based on the second-machine-language-circuit and second-qubit-hardware-information;
reading a second-synchronization-time from a second-clock into the second-implementer; and
comparing the second-synchronization-time with the second-timestamp to determine a second-timing-criterion and when the second-timing-criterion is satisfied sending the second-control-circuit to second-qubit-control-hardware for application to the second qubit.

14. The method of claim 13, wherein:
the first-machine-language-circuit comprises the second-qubit-identifier; and
the first-qubit-control-instruction comprises a two-qubit-gate-control-instruction configured to apply a two-qubit-gate between the first qubit and the second qubit.

15. The method of claim 13, wherein:
the first-clock is synchronized with the second-clock;
application of the first-control-circuit to the first qubit begins at a first-start-time;
application of the second-control-circuit to the second qubit begins at a second-start-time; and
a difference between the first-start-time and the second-start-time is less than a predetermined threshold.

16. The method of claim 15, wherein the application of the first-control-circuit and the application of the second-control-circuit comprises application of a two-qubit-gate between the first qubit and the second qubit.

17. The method of claim 13, wherein the second-qubit-control-instruction is a second-measurement-instruction, the method further comprising:
receiving at the second-implementer, in response to the application of the second-control-circuit to the second qubit, a second-measurement-result from the second qubit and writing the second-measurement-result to the first-classical-register and to the second-classical-register.

18. The method of claim 17, further comprising:
reading a further-first-machine-language-circuit from the first-machine-language-buffer into the first-implementer, wherein the first-machine-language-circuit comprises:
a further-first-timestamp;
the first-qubit-identifier unique to the first qubit;
a further-first-qubit-control-instruction; and
the first-protected-location of the first-classical-register,
reading a further-first-control-value from the first-protected-location of the first-classical-register into the first-implementer, the first-control-value configured to encode either a further-first-execute-instruction or a further-first-alternate-control-instruction, wherein if the further-first-control-value encodes the further-first-execute-instruction then:
  determining a further-first-control-circuit for the first qubit based on the further-first-machine-language-circuit, further-first-qubit-hardware-information and the second-measurement-result;
  reading a further-first-synchronization-time from the first-clock into the first-implementer; and
  comparing the further-first-synchronization-time with the further-first-timestamp to determine a further-first-timing-criterion and when the further-first-timing-criterion is satisfied sending the further-first-control-circuit to the first-qubit-control-hardware for application to the first qubit.

19. An apparatus configured to control a quantum memory of a quantum computer, the quantum memory comprising a first qubit, the apparatus comprising:
  a first-classical-register;
  a first-clock;
  a first-machine-language-buffer configured to store a first-machine-language-circuit comprising:
    a first-timestamp;
    a first-qubit-identifier unique to the first qubit;
    a first-qubit-control-instruction; and
  a first-protected-location of the first-classical-register,
  a first-implementer configured to:
    read the first-machine-language-circuit from the first-machine-language-buffer;
    read a first-control-value from the first-protected-location of the first-classical-register, the first-control-value configured to encode either a first-execute-instruction or a first-alternate-control-instruction, wherein if the first-control-value encodes the first-execute-instruction then:
      determine a first-control-circuit for the first qubit based on the first-machine-language-circuit and first-qubit-hardware-information;
      read a first-synchronization-time from the first-clock; and
      compare the first-synchronization-time with the first-timestamp to determine a first-timing-criterion and when the first-timing-criterion is satisfied send the first-control-circuit to first-qubit-control-hardware for application to the first qubit.

20. A computer program product including one or more sequences of one or more instructions which, when executed by one or more processors, cause an apparatus to at least perform the method of claim 1.

* * * * *